(12) United States Patent
Grobler et al.

(10) Patent No.: US 8,747,731 B2
(45) Date of Patent: Jun. 10, 2014

(54) DEVICE FOR CONDITIONING PROCESS GASES FOR THE HEAT TREATMENT OF METALLIC WORK PIECES IN INDUSTRIAL FURNACES

(71) Applicant: Ipsen, Inc., Cherry Valley, IL (US)

(72) Inventors: Werner Hendrik Grobler, Bedburg-Hau (DE); Peter Haase, Isselburg (DE); Bernd Edenhofer, Kleve (DE); Jens Bechthold, Hamminkeln (DE); Thorsten Requardt, Wesel (DE); Thomas Eversmann, Dorsten (DE)

(73) Assignee: Ipsen, Inc., Cherry Valley, IL (US)

( * ) Notice: Subject to any disclaimer, the term of this patent is extended or adjusted under 35 U.S.C. 154(b) by 0 days.

(21) Appl. No.: 13/682,042

(22) Filed: Nov. 20, 2012

(65) Prior Publication Data

US 2013/0078152 A1 Mar. 28, 2013

Related U.S. Application Data

(62) Division of application No. 12/862,898, filed on Aug. 25, 2010, now Pat. No. 8,333,852.

(30) Foreign Application Priority Data

Aug. 26, 2009 (DE) ........................ 10 2009 038 5983

(51) Int. Cl.
*B01J 8/00* (2006.01)

(52) U.S. Cl.
USPC .............................................. 266/81; 266/252

(58) Field of Classification Search
USPC ................................................ 266/78, 81, 252
See application file for complete search history.

(56) References Cited

U.S. PATENT DOCUMENTS

| 3,252,694 | A | * | 5/1966 | Davis, II | .......................... | 266/81 |
| 3,519,257 | A | * | 7/1970 | Winter et al. | .................. | 148/218 |
| 8,313,586 | B2 | * | 11/2012 | Edenhofer et al. | ............ | 148/216 |

* cited by examiner

*Primary Examiner* — Scott Kastler
(74) *Attorney, Agent, or Firm* — Dann, Dorfman, Herrell and Skillman, P.C.

(57) ABSTRACT

In a device for preparing process gases (3) for heat treatments of metallic materials/workpieces, the respective process gas (3) is to be fed into at least one treatment chamber (1.1) in an industrial furnace (1) having been practically fully prepared, homogenised and heated, and the method is to be carried out both with newly built and particularly with already existing installations of industrial furnaces (1) with the aid of the device, wherein the process gas (3) is prepared with compression at temperatures uncoupled from the temperature in the treatment chamber (1.1), in a process separate from the heat treatment process in the treatment chamber (1.1), and in a temperature range up to about 1250° C., and is rendered usable for economical and low-emission heat treatment (FIG. 3).

15 Claims, 3 Drawing Sheets

DEVICE FOR CONDITIONING PROCESS GASES FOR THE HEAT TREATMENT OF METALLIC WORK PIECES IN INDUSTRIAL FURNACES

CROSS-REFERENCE TO RELATED APPLICATION

This application is a division of U.S. application Ser. No. 12/862,898, filed Aug. 25, 2010, now U.S. Pat. No. 8,333,852, the entirety of which is incorporated herein by reference.

BACKGROUND OF THE INVENTION

1. Field of the Invention

The invention relates to a method and a device for preparing process gases for heat treatments of metallic materials/workpieces in industrial furnaces, wherein the heatable process gases include a treatment medium as a protective gas and/or for example a reaction gas.

2. Description of the Related Art

In general, a process gas for the heat treatment of metallic materials/workpieces in industrial furnaces is understood by a person skilled in the art to be a treatment medium such as for example a protective gas containing carbon monoxide, hydrogen and nitrogen, carbon dioxide oxygen and/or steam, and/or for example a reaction gas containing hydrocarbons for "carburisation processes", which relate to the carburising or carbonitriding of metallic materials/workpieces.

Thus, in one of the steps of carburisation for example, a gas containing hydrocarbons is added to a process gas reacting in the treatment chamber to create the requisite furnace atmosphere. In this process, the individual components of the process gas are intended to create a controllable state of equilibrium in the furnace atmosphere so that the carbon is able to be transferred from the gas atmosphere to the metallic materials/workpieces in a manner that is both controlled and reproducible. Automatic control of processes of this kind is assured by regulation of the C level, such as is described in DE 29 09 978 and has become successfully established in industrial practice for the heat treatment of metallic materials/workpieces. However, the control of the C level solved so advantageously here fails to make use of catalytically usable potential with regard to modern requirements.

Thus for example, in his report entitled "Gas mixtures fed hot into the furnace chamber as the atmosphere for heat treatment of steel", (HTM 30 (1975) Vol. 2, p. 107-) W. Goring had already suggested using a protective gas retort with catalyst bed integrated in the industrial furnace to feed hot process gas into the treatment chamber, regardless of the temperature there, as a way to speed up the level of activation of a furnace atmosphere. For the purposes of modern specifications, this method is associated with a number of drawbacks, because it requires constant replenishment with fresh gas, that is to say regulation is effected by enriching the gas, and harmful emissions must be contended with.

The use of catalysts is also described in other documents, such as for example DE 36 32 577, DE 38 88 814, DE 40 05 710, DE 691 33 356, and DE 44 16 469.

The documents GB 1,069,531 and JP 62199761 relate to the treatment of metals in a carburised atmosphere.

U.S. Pat. No. 3,620,518 describes the treatment of workpieces in hardening furnaces having a catalyst lining of nickel oxide, which has been applied to the ceramic interior wall and increases the available surface area. U.S. Pat. No. 4,294,436 describes a heat treatment of metal parts with a protective atmosphere in furnaces having catalytic walls of Ni. U.S. Pat. No. 5,645,808 describes catalytic oxidation with carbon compounds in gas streams. US 2006/0081567 describes a plasma-supported workpiece treatment.

In order to improve the process effect of the gas feed in the abovementioned industrial furnaces, it has already been suggested in DE 10 2008 029 001.7-45 to tailor the supply of hydrocarbon to specific carburisation requirements so as to economise on protective gas and reduce heat energy losses, to adjust the C potential in the protective gas and prevent uncontrollable and/or undesirable reactions. This resulted in the creation of a new protective gas recirculation system for gas carburisation. In this, the components carbon dioxide, oxygen and steam react with a supplied hydrocarbon in a processing area of the treatment chamber of a species-related industrial furnace to yield carbon monoxide and hydrogen again, in this case catalytically. In this way, previously "used" protective gas, that is to say a protective gas with a low C potential, may be advantageously reprocessed. The C potential is adjusted in the processing area of the treatment chamber. The "processed" protective gas may then be fed back into the treatment chamber at one or more points, thus establishing a truly circular process for gas carburisation.

According to this new method
 the components carbon dioxide, oxygen and steam react with a fed supply of a hydrocarbon as the reagent gas to yield carbon monoxide and hydrogen in a processing area equipped with catalyst bed in an industrial furnace,
 the protective gas has elevated C potential, and the C potential is adjusted,
 the catalytic reaction is accelerated, and
 the protective gas processed in this way is returned to the treatment chamber in a recirculation system.

The purpose of this was to improve the process of uniform carburisation and enable costs for process gas to be reduced further.

However, more extensive research was needed in order to ensure even more reliable and reproducible heat treatment for industrial furnace operators, because the method described above requires the treatment chamber and the heating chamber to be as impermeable as possible, and reaction temperatures in the heating chamber do not exceed for example 850-950° C.

In this context, the quality requirements for case hardening had to be analysed again, particularly with respect to parameters such as
 case hardening depth/carburisation depth,
 surface hardness/surface carbon content,
 perlite/troostite seam,
 residual austenite content,
 carbide formation,
 surface oxidation depth as well as
 dimensional and shape changes and
 core hardness
if they were to be correlated even indirectly with the degree of carburisation. In this case, the depth of carburisation and the carbon concentration were both significant factors.

In the existing industrial carburisation methods, such as gas carburisation in atmosphere furnaces and low-pressure carburising in vacuum furnaces, the objective is one that is familiar to those skilled in the art: all parts of the workpieces in a batch must be carburised with total uniformity, to the same C content and the same carburisation depth.

With gas carburisation, in which the furnace atmosphere is adjustable via equilibrium reactions, this may be achieved more effectively than by non-equilibrium carburisation using hydrocarbons.

Accordingly, gas carburisation, that is atmospheric gas carburisation, is the preferred process.

In this process, the following known, various process steps are performed, it is essential to take all of them into account to ensure reproducible, even carburisation:
1. The gas reactions for creating the carburising gas components in the atmosphere.
2. Gas phase homogenisation for transporting the carbon-containing molecules in the gas phase and to the part to be carburised.
3. Diffusion transport, that is to say transport of the carbon-containing molecules by the flow boundary layer to the surface of the part.
4. Dissociation and adsorption relating to splitting of the molecules on the surface of the part.
5. Absorption, that is to say the uptake of the carbon by the part surface.
6. Diffusion as the means of transporting the carbon into the part.

As has already been described in the outcome in DE 10 2008 029 001.7-45, the decisive reactions for carburisation in the carburisation atmosphere are:

$CH_4 \Rightarrow C+2H_2$      Methane dissociation $2CO \Leftrightarrow C+CO_2$      Boudouard reaction $CO+H_2 \Leftrightarrow C+H_2O$      Heterogeneous water-gas reaction $CH_4+CO_2 \Rightarrow 2CO+2H_2$      Enrichment reaction 1

$CH_4+H_2O \Rightarrow CO+3H_2$      Enrichment reaction 2

In order to build on the advance represented by DE 10 2008 029 001.7-45 with regard to the prior art, it is important to influence the kinetics and also the direction of these reactions, because they depend to a large degree on the temperature which—as was explained previously—is regularly limited to 850-950° C., but are not enabled at temperatures significantly below this.

Since the transportation of the carbon carrier is usually effected through forced convection, the powerful circulation of the atmosphere within the heating chamber helps to ensure that the carbon carriers are thoroughly mixed and the flow thereof is then directed towards the part.

Thus, for example, the following relationship is known to apply for mass transfer when the atmospheric flow is directed towards a flat workpiece panel

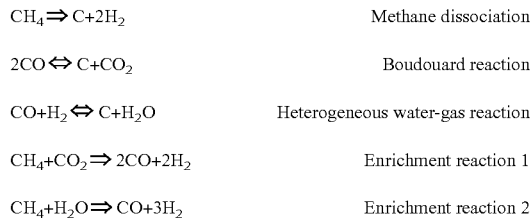

wherein
a coefficient of diffusion is represented by D;
a length of the part to which flow is directed is represented by L;
a flow speed is represented by V; and
a kinematic viscosity is represented by v.

Accordingly, as the flow speed increases the effective coefficient of mass transfer β also becomes larger, and it is this relationship that must be used even more efficiently.

The known relationship to the effect that the speed of diffusion through the flow boundary layer is essential and cannot be influenced by changing the flow speed had to be studied further.

In this regard, it is the magnitude of the coefficient of diffusion in the gas that is decisive, and this is critically dependent on temperature and pressure. In an initial approximation—also known—, doubling the pressure halves the diffusion coefficient.

The thickness of the boundary layer may be determined using the relationship familiar to those skilled in the art $$\delta(x) = 4.64\sqrt{\frac{v \cdot x}{V_\infty}}$$

where
thickness of the boundary layer is represented by $\delta(x)$;
distance from the edge of the part is represented by x; and
speed of the gas farther from the part is represented by $V_\infty$.

It may be observed that increasing the speed of the gas reduces the thickness of the boundary layer, which in turn shortens the transport time to the surface. Use of this relationship must be improved as well.

Finally, the splitting reaction of the carbon monoxide on the part according to the known equation $CO \Rightarrow C+\frac{1}{2}O_2$ is also the underlying reaction for transferring carbon for gas carburisation in CO/H mixtures, which, besides still other reactions, enables the carburisation effect of the atmosphere to take place continuously, as is shown in FIG. 1, which illustrates known findings.

In order to arrive at advanced solutions proceeding from this known basis, the creative approach had to be applied and exploited in a technologically new way, in particular that
the speed of carbon transfer depends on the property of the atmosphere, and
the oxygen generated during splitting must be bound and then removed by convection.

Since hydrogen is needed for this, the speed of dissociation of the carbon monoxide in the presence of a sufficiently large quantity of hydrogen becomes the determining parameter.

The speed at which the carbon is absorbed by the workpiece surface in turn depends on the difference between the carbon activities in the atmosphere and in the part. This means, if the carbon activity in the gas is greater than in the part, the net effect is a transfer of the carbon to the workpiece surface.

In practice, this difference may be characterized in pure iron and unalloyed steel by the difference between the C potential and the carbon content in the workpiece surface, wherein the diffusion of the carbon can be described by Fick's laws, which will not be further elaborated on here.

Accordingly, a new inventive task must address the fact that diffusion depends on the temperature and the progression of the concentration of carbon C in material having depth x.

SUMMARY OF THE INVENTION

In the context of these detailed investigations, the object of the invention is to provide a method for preparing process gases for heat treatments of metallic materials/workpieces in industrial furnaces of the species described, by which at least one of the components containing a process gas, having been practically completely prepared, and also homogenised and heated, is fed into the at least one treatment chamber thereof and is able to be connected by a device both to newly manufactured as well as and particularly to units of industrial furnaces that have already been in service, such that the process gas is able to be used for heat treatment in the respective industrial furnace economically and with low emissions, and ideal carburisation conditions in terms of
  temperature,
  gas flow towards the parts,
  homogenisation of the gas phase, and
  rapid reaction kinetics
are created uniformly throughout the treatment chamber of the industrial furnace in accordance with the six process steps listed above.

Unlike the prior art, the invention is therefore intended for industrial furnaces, particularly those referred to as atmosphere furnaces, in which previously the components of the process gas to be heated were normally prepared in the treatment chamber as the heating chamber, before they were introduced for carburising or carbonitriding heat treatment of metallic workpieces/materials, wherein in an upstream process and with a device that may be connected to the industrial furnace, the process gas is practically entirely prepared beforehand and then fed into the treatment chamber with direct effect so that the heat treatment process may be carried out in a more efficient, more environmentally responsible manner for operators in the industry, and to provide a corresponding unit that is able to be retrofitted in older industrial furnaces.

With this statement of the object, approaches to finding inventive solutions are informed by the fact that the temperature in both the treatment chamber and the heating chamber of modern industrial furnaces can be maintained with a uniformity of at ±5° C. This means that when the heating and soaking phase is finished, all austenised parts are at the same temperature.

If special gas feed devices are also arranged inside the heating chamber, they already enable the remaining convective heat transfer portions to be used in a defined way to achieve the all-important uniformity of temperature throughout the entire batch chamber. In certain cases, it is then possible to achieve tolerances of just ±3° C.

Ideal temperature uniformity can only be established if the gas flow is directed to all parts optimally. Accordingly, excellent temperature uniformity needs another circulation system, or more importantly one that has been devised differently from previous systems, and which must be considered as a unit.

Besides establishing temperature uniformity and optimal exposure of the parts to the carburising gas flow, a third aspect of circulation to be considered is homogenisation of the atmosphere, which enables the gas reactions for initiating consistent carbon activity (C level) to be sustained throughout the batch chamber and in the treatment chamber.

In order to set a defined atmosphere, continuous gasification with carrier and enrichment gas must always be adjustable directly via the circulation system.

The continuous interaction between the furnace atmosphere and the surface of the workpiece, and the associated transfer of carbon from the gas causes the carbon activity (C level) in the atmosphere to change constantly, so that it is imperative to measure this variable. This is assured with the aid of the oxygen probe (and thermoelement) on the basis of an oxygen partial pressure measurement. Natural gas (or another hydrocarbon) is added to the air to adjust the C potential.

Accordingly, carburisation of the parts and the enrichment of the process atmosphere necessitated thereby leads to a permanent imbalance therein. Balanced adjustment of the C level must create a quasi-stationary equilibrium in generating a generally balanced atmosphere despite these locally occurring imbalances, and this is illustrated in FIG. 2 to provide a better understanding of the object of the invention in the circular gas carburisation process that is central to the invention.

In this figure, the carburisation reactions responsible for carburisation, all of which lead to the formation of carburising carbon monoxide, are shown on the left.

One carburising reaction appears at top right in FIG. 2, that is unbalanced carburisation due to methane dissociation. A locally occurring, impermissible increase in the concentration of methane in the CO- and $H_2$-containing process atmosphere can result in partial overcarburisations on the parts, which then in turn cause residual austenite and/or carbide formation. Methane dissociation is not normally detected by the sensors, and consequently it is most often perceived as an interference factor during the process.

However, it is possible to achieve the interaction between gasification and adjustment of the C level within the atmosphere according to an internal development stage, wherein this interaction is defined by the maintenance of a tolerance of ±0.05% C in the surface carbon content of the workpiece, and results in uniform carburisation of the surface layer.

If a person skilled in the art assumes the degrees of effectiveness that are achievable using the carburisation gasification techniques that are standard today, he would recall that in operating industrial furnaces
  thermal losses occur such as in the flare when the protective gas is burned off, and
  approximately 98% of the carbon that is fed into the carburisation process is not available for carburising at all, instead it is merely burned off, so that
  the degree of efficiency in carburisation is thus less than 2%, and
  other technologies are addressing the question of how to exploit the heat energy that is discharged into the ambient air.

A new gasification process was already proposed in the document DE 10 2008 029 001.7-45 cited above, according to which the protective gas is no longer burned off, but instead is returned to the heating chamber by recirculation after undergoing an intermediate step as preparation, and is thus no longer dissipated, but reused.

The purpose of this invention is now to take the process another important step forward, in which the reactions proceeding within the heating chamber due to carburisation, such as:

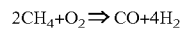
$$2CH_4 + O_2 \Rightarrow CO + 4H_2$$

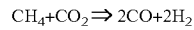
$$CH_4 + CO_2 \Rightarrow 2CO + 2H_2$$

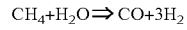
$$CH_4 + H_2O \Rightarrow CO + 3H_2$$

have been examined again with regard to more interference factors.

According to this, the intention was
  to enable better use to be made of the catalytic potential,
  to ensure that above 850° C. the temperature actually required in the furnace chamber does not result in reprocessing of protective gas that has already been "consumed", a process that while advantageous on its own has negative effect on the reactions,
  to ensure that the catalytic effect is guaranteed regardless of the temperature in the furnace chamber, that is to say significantly above but also below temperatures, and
  to ensure that the enrichment gas is passed directly through the catalyst, and not fed into the furnace chamber first.

Unlike previous approaches, in the present invention the protective gas is to be generated and enriched in a distinct preparation process, separately from the batch, so that it is possible to expose the batch to a gas atmosphere that is consistently homogeneous. As a result, streaks or inconsistencies are not formed when natural gas is introduced into the heating chamber for the purpose of enrichment. Undesirable local overcarburisations, such as are caused by unbalanced carburisation due to the methane dissociation described above, are to be almost entirely prevented.

The low environmental impact of the method is demonstrated by its carbon footprint. $CO_2$ emissions are lowered significantly by the extensive economies in process gas.

Although it has not yet been possible to use the information gained from DE 10 2008 029 001.7-45 for a wide range of industrial furnaces of the species described in the introduction that are already in service, a further field of application is now accessible by virtue of the fact that it is possible to retrofit existing industrial furnaces, and thus achieve even greater efficiency than was offered by the method according to DE 10 2008 029 001.7-45. In particular, older inventories of industrial furnaces that are at operators' sites and still operable are able to be retrofitted according to the invention.

Starting from the prior art situation described in the preceding, this newly gained knowledge may now be applied to a wide range of currently operating industrial furnaces of the technological species described in the introduction. Although some of these solutions were implemented, for example a protective gas retort with protective catalyst bed integrated in the industrial furnace, they were only implemented as integrated components of furnace units and involved the disadvantageous supply of enrichment gas but not gas recirculation.

It was also typical and disadvantageous in such arrangements that the process gases were always prepared under the conditions prevailing in the respective treatment chamber as the heating chamber and directly associate functional units. Accordingly, it was not possible to prepare the gases under higher or lower temperature conditions.

The present invention now makes it possible for operators' existing older industrial furnaces, which are still serviceable but are not yet being operated with the full range of commercial/technological and ecological advantages, to be run in an environmentally conscious manner and with economical use of energy carriers.

The invention provides a method for preparing process gases for heat treatments of metallic materials/workpieces in industrial furnaces, by which at least one of the components containing a process gas, having been practically completely prepared, and also homogenised and heated, is fed into the at least one treatment chamber thereof and is able to be connected by a device both to newly manufactured as well as and particularly to units of industrial furnaces that have already been in service, such that the process gas is able to be used for heat treatment in the respective industrial furnace economically and with low emissions.

Unlike the prior art, the invention enables industrial furnaces, particularly those referred to as atmosphere furnaces, in which previously the components of the process gas to be heated were normally prepared in the treatment chamber as the heating chamber, before they were introduced for carburising or carbonitriding heat treatment of metallic workpieces/materials, an upstream method and a device that may be connected to the industrial furnace enables the process gas to be processed in the manner explained in the preceding, wherein the actual preparation process is able to take place and is favoured by higher reaction temperatures up to about 1250° C. and at significantly lower reaction temperatures, that is to say higher and lower than the temperature of 850° C.-950° C. in the treatment chamber, and that in this context particularly accelerated reactions such as enrichment and generation, as described for example by $$2CH_4 + O_2 \rightarrow 2CO + 4H_2$$

$$CH_4 + CO_2 \rightarrow 2CO + 2H_2$$

$$CH_4 + H_2O \rightarrow CO + 3H_2$$

are encouraged and able to take place, so that this process gas may then be fed directly to the treatment chamber of the industrial furnace, so that the carburising reactions there, for example $$2CO \rightarrow C + CO_2$$

$$CO + H_2 \rightarrow C + H_2O$$

$$CO \rightarrow C + 0.5O_2$$

are able to take place with direct effect at the usual, cited temperatures.

In this context, other reaction equations in keeping with the central idea of the invention may also take place depending on the corresponding heat treatment method and the gas components for preparing the process gas and the treatment-related consumption thereof for the purposes of central idea of the invention.

The entire heat treatment process may thus be carried out by operators in the industry in an even more efficient and environmentally conscious manner, for which purpose the corresponding unit has been created so that according to the invention it is able to be retrofitted in older industrial furnaces.

In summary, the sequence of the method is configured according to the invention such that the process gas, which includes at least a first treatment medium as a protective gas, which also contains the components carbon dioxide, oxygen and steam in addition to the minimum components carbon monoxide, hydrogen and nitrogen, and a second treatment medium as a reagent gas, which initiates a carburising or carbonitriding treatment, a) is prepared separately with regard to at least one of the properties thereof that is essential for heat treatment, such as chemical reactions, temperatures, pressures or flow speeds, in a preparation chamber of an external module outside of the treatment chamber and the industrial furnace at temperatures of up to 1250° C. and with the use of a compressor according to the following reactions, for example, $$2CH_4 + O_2 \rightarrow 2CO + 4H_2$$

$$CH_4 + CO_2 \rightarrow 2CO + 2H_2$$

$$CH_4 + H_2O \rightarrow CO + 3H_2$$

such that the components such as carbon dioxide, oxygen and steam react catalytically with a hydrocarbon as the reagent gas to form carbon monoxide and hydrogen, and after this reaction the protective gas has a required C potential, after which b) the process gas thus prepared is forced out of the preparation chamber of the external module by the compressor and fed to the treatment chamber in the industrial furnace, having been compressed, homogenised and accelerated, and is directed via single-point or multipoint feeds towards the materials/workpieces, where the carburising or carbonitriding treatment is carried out according to the following reaction, for example, $$2CO \rightarrow C + CO_2$$

$$CO + H_2 \rightarrow C + H_2O$$

$$CO \rightarrow C + 0.5 O_2$$

wherein
c) at least one treatment medium of the process gas is recirculated and is recovered for use in the preparation described in step a).

Experience has shown that the gas passing through pipelines can undergo a reactive breakdown, depending on the length and diameter of required pipe connections between the treatment chamber and preparation chamber.

This is to be avoided by rapidly cooling the gas after it exits the treatment chamber, or even after it exits the preparation chamber.

As an alternative, achieving the high gas temperature by insulating and, if necessary, heating the pipelines also constitutes a suitable means for avoiding gas breakdown.

In the device for implementing the method, the respective pipeline must correspondingly have allocated to it a cooling aggregate, e.g., designed as ribbed pipe piece with ducted or induced cooling, or an insulation or heater, in particular directly behind the treatment chamber or behind the preparation chamber.

With this method, it is possible to produce a process gas that has been compressed, homogenised, and heated to a higher, but also to a lower temperature, which process gas together with at least one second treatment medium as the reagent gas containing a hydrocarbon and also ammonia as components causes carburising and/or carbonitriding during heat treatment of materials/workpieces or the treatment medium thereof, wherein at this point at least one treatment medium of the process gas fed into the treatment chamber of the industrial furnace is recirculated in the treatment chamber for separate reconstitution.

The process gas is processed separately and catalytically in the module described to yield a circulation/mixture that is optimised for heat treatment and is able to overcome flow resistances with the assistance of the compressor, for subsequent, direct use in heat treatment in the industrial furnace.

By the time it reaches the industrial furnace, the process gas has thus been prepared, fully reacted, compressed, homogenised and accelerated, so that the carburising effect is able to take place directly on the workpieces/materials directly in the treatment chamber of the industrial furnace without the need to perform the reactions and preparation in the treatment chamber, as previously, and then control/adjust the treatment medium according to the C level as a function of the workpieces/material that are to be treated.

The composition of the gas siphoned out of the treatment chamber and relayed into the preparation chamber varies as a function of the level of thermochemical gas reactions and gas metal reactions taking place in the treatment chamber.

In terms of the input/output monitoring described in the invention, the gas is to be optimally prepared in the preparation chamber by precisely adjusting the unburned gases being fed into the preparation chamber, e.g., natural gas and air, along with other hydrocarbons and other oxidizing gases, relative to a supplied overall quantity and ratio of supplied individual quantities, based on the quantity and composition of the gas to be prepared and the desired preparation result.

In a thermochemical heat treatment process, such as carburisation or carbonitration, the overall composition in the treatment chamber varies throughout the entire duration of the process. Therefore, an optimally prepared reaction gas cannot be generated by supplying a chronologically constant quantity of unburned gas in a chronologically constant ratio of the individual unburned gas components into the preparation chamber.

The inventive process of optimal gas preparation is set up therein from a procedural standpoint by measuring the composition, streaming quantity and temperature of the gas to be prepared after exiting the treatment chamber and before entering the preparation chamber, and of the prepared gas after exiting the preparation chamber and before entering the treatment chamber, and continuously changing the entire quantity of unburned gas fed into the preparation chamber along with the relative quantities of individual unburned gas components relative to each other, so as to achieve an optimal preparation result.

The process creates a closed control loop, in which target variables for the prepared gas are defined based on an analysis of the gas to be prepared, in particular with respect to CO content and $CH_4$ content, and potentially also with respect to $H_2$ content and $CO_2$ or $H_2O$ content, wherein they are reached by varying the quantities of individual unburned gas components fed to the preparation chamber, and monitored and readjusted as needed by analysing the prepared gas.

The corresponding device for this control loop for assuring the quality of the prepared gas consists of gas composition analysers, in particular for gas components CO and $CH_4$, but also $CO_2$ and $H_2$, and potentially $H_2O$ and/or $O_2$. Sensors for determining the quantity and temperature of the gas entering the preparation chamber for preparation and exiting the preparation chamber after prepared, controllable metering valves and rate meters for the unburned gases fed into the preparation chamber, as well as a programmable control system for processing the measuring data, calculating the target variables, and relaying the control signals to the actuators, such as valves, etc.

In this way, a treatment stimulus that increases the effectiveness of the heat treatment is created immediately in the treatment chamber according to at least one of the parameters such as temperature, CO content or pressure through integrated monitoring/measurement/control/adjustment of the atmosphere in the treatment chamber or the temperature of the process gas. In this context, the monitoring/measurement/control/adjustment is further supported in the treatment chamber by at least one of the parameters, such as oxygen partial pressure, $CO_2$ content, and dewpoint of the atmosphere.

With this method, it is advantageously possible to add air from a cold area to at least one treatment medium of the process gas that is to be prepared.

The method as a whole is characterized in that the prepared process gas is extracted from the treatment chamber again and fed back into the external module, prepared again as before, and forwarded back to the treatment chamber of the industrial furnace.

For the accelerating and compressing circulating/mixing motion of at least one of the treatment media in the process gas, air is fed from a cold area to at least the one compressor located in the external module.

For control and adjustment, software is used that adds another treatment medium, for example a reagent gas, by segments in pulsed, timed, and/or constant quantities from at least one treatment medium of the process gas, for example the atmosphere in the treatment chamber.

In this way, if carburisation causes the concentrations of $CO_2$, $H_2O$ and $O_2$ to increase and the C level to fall in the heating chamber, this diluted gas is fed back into the preparation chamber, which is separate and thus locally isolated from the heating chamber.

Here, the C level is enriched by the addition of finely metered quantities of natural gas, initiating the reactions described earlier, such as $$2CH_4 + O_2 \Rightarrow 2CO + 4H_2$$

$$CH_4 + CO_2 \Rightarrow 2CO + 2H_2$$

$$CH_4 + H_2O \Rightarrow CO + 3H_2$$

and reducing the concentrations again.

However, natural gas is only added to the preparation chamber if the C potential falls. While enrichment is not required, no natural gas is added. Natural gas only needs to be introduced to enrich the mixture, and then in the smallest quantities, when the C potential falls as a result of carburisation (and not due to flushing, as was previously the case). In the ideal operating state, therefore, carbon in the form of natural gas only needs to be added in a quantity necessary for carburising the part, in order to lower the C level, air may be introduced.

No additional protective gas generator is required to ensure the process reliability of an industrial furnace, because this function is performed by the external preparation chamber.

The heat treatment process workflow is configured such that, after the heating chamber has been loaded with the batch of materials/workpieces, flushing gasification with protective gas generated by the system is carried out for a defined initial period so that the desired furnace atmosphere is restored as quickly as possible. For this, a natural gas/air mixture is fed into the preparation chamber, a solenoid valve to a burn-off system equipped with a pilot burner is opened, and the furnace is flushed with protective gas. After the flushing period, all valves on the burn-off system area closed and recirculation is started. In this way, the protective gas is recirculated to the external preparation chamber of the separate module and may be adjusted to the desired C level and prepared by the metered addition of natural gas.

The fully prepared protective gas can also be introduced into the heating chamber via a plurality of points as a multi-point feed inside the heating chamber. In this way, is it possible to establish a homogeneous gas atmosphere more quickly than was the case with conventional methods. In addition, the geometry of the treatment chamber may be optimised for a given application by using a selectable single-point or multi-point feed system.

For example, if atmospheric heat treatment furnaces are equipped with a strong internal gas circulation system and given a multi-point feeding process, the reaction gas to be prepared can be siphoned out of the treatment chamber, and the gas prepared in the preparation chamber can be returned to the treatment chamber via a single interface in the form of a coaxial dual pipe with an inner pipe that is somewhat longer than the outer pipe.

The reaction gas to be prepared is here advantageously siphoned off via the inner pipe, while the prepared gas is returned via the outer pipe.

As a result, minimal structural changes, if any, are normally required when retrofitting existing heat treatment furnaces with the gas preparation system according to the invention. It is in this way that the overall decisive advantage of the method, as described in the preceding, becomes evident. The protective gas is generated and enriched separately from the batch, that is to say the batch is constantly exposed to a homogeneous gas atmosphere. No streaks or inconsistencies occurred due to the introduction of natural gas into the heating chamber for enrichment, so that undesirable local over-carburisations, such as may be caused by non-uniform carburisation to due to methane dissociation, are precluded.

The CO content is not constant during treatment because natural gas is added to compensate for the effects of carburising. Accordingly a CO analyser is needed to enable adjustment. If the CO content falls below a minimum value, the option still remains to increase the CO content again with a brief flushing phase. In the course of the process, the concentrations of CO and $H_2$ initially fall and rise during the over-carburisation phase, because until this time a relatively large quantity of $CH_4$ has been needed initially to saturate the surface of the parts being treated.

In the process sequence according to the invention, this behaviour is advantageously such that less enrichment is required. During the diffusion phase, in which the need for enrichment gas is the smallest, the concentrations are thus approximately equivalent to the normal reaction compound.

Accordingly, a practically self-regulating, adaptive gasification system has been created in which natural gas is only added as an enrichment agent when the C potential of the atmosphere falls because of carburisation of the parts, and not due to flushing losses or such other causes.

The circular process for making significant economies in process gas, as represented by the ideal objective illustrated in FIG. 2, is fulfilled with the invention.

The external module associated with the performance of the method, and which is to be used preferably, essentially includes the following in a housing:

a) a closable preparation chamber with a catalyst and temperature adjustment device for preparing the process gases, which is via one detachable and sealable inflow line for a prepared process gas to be introduced into the treatment chamber of the industrial furnace and one sealable outflow line for a treatment medium from an area or from the treatment chamber of the industrial furnace, b) a blower-type compressor with drive unit attached to the preparation chamber and functionally integrated with the inflow line, c) equipment for measuring the inflow of treatment media of the process gas, the pressure in the treatment chamber, the rotating speed of the compressor and the temperature of the catalysts, which equipment is connected functionally to the treatment chamber of the industrial furnace, the preparation chamber and the compressor, and d) an assigned switching unit for controlling and adjusting parameters such as the pressure, temperature, the volume flow of the process gas to be prepared in the preparation chamber for the purpose of feeding the treatment media, feeding the prepared process gas into the treatment chamber of the industrial furnace, and the C level.

From the point of view of someone skilled in this field, these reactions are to be understood such that of course air and the cited hydrocarbon gas may also be used to adjust the carbon potential. This means that at quantity of air is introduced if the C potential is to be lowered; on the other hand, a hydrocarbon gas is introduced if it is desired to raise the C level.

The fundamentally new gas preparation process corresponding to the preliminary stage of the invention was already defined in the DE 10 2008 029 B1 cited at the outset. This process involves reducing the gas components $CO_2$ and $H_2O$ to CO and $H_2$ in a preparation chamber not separately arranged there by means of unburned gases fed into the preparation chamber, which essentially consist of hydrocarbons, if necessary with certain percentages of an oxidizing gas, such as $O_2$, $CO_2$, etc.

To this end, the gas to be prepared and the unburned gases must be heated to a reaction temperature necessary for the conversion, and a metal catalyst must be present to accelerate the process. Depending on the metal of the used catalyst, the necessary conversion temperatures range from 800° C. to 1250°.

Since no prepared reaction gas is often available at the start of the process in heat treatment furnaces operated with reaction gases, it must first be generated for the respective location.

In an especially advantageous embodiment of the preparation chamber, the latter can also be used to generate the reaction gas required by the heat treatment furnace.

In this reaction gas generating process, the preparation chamber is operated similarly to an endothermic atmosphere generating system (like an endothermic gas generator), specifically in such a way as to entirely or partially prevent the supply of gas from the treatment chamber into the preparation chamber (by stopping or decelerating the circulating fan or closing the corresponding line valve), raise the quantities of hydrocarbons and oxidizing gases metered in the preparation chamber based on the required amount of endothermic gas to be generated, and analyse and regulate the quality of the generated endothermic reaction gas, relaying the endothermic gas generated in this way to the furnace in a hot or cooled state.

After the treatment chamber of the furnace according to the invention has been scoured for the corresponding requisite period of time with the endothermic reaction gas generated in the preparation chamber, the furnace is ready for thermochemical heat treatment, and the preparation chamber can be switched from the gas generating process to the gas preparation process.

In an especially advantageous way, this enables the configuration and combined utilization of the preparation chamber for the gas generation and gas preparation of reaction gases.

In order to satisfy these requirements, the preparation chamber is designed to be fire-resistant and gastight, and provided with a heater and temperature controller.

In order to accelerate the gas reactions described above, metals known from the gas generating systems, in particular nickel, are used as the catalyst material.

The performance of the preparation chamber with respect to quantity and quality of preparation or of the generated reaction gas depends on the reaction temperature level, in particular on the size of the catalyst surface. Catalysts of the kind used for scrubbing the exhaust gas in passenger car engines yield catalysts that perform at an especially high level, while at the same time exhibiting a compact structure.

The overall scope of the invention may be represented in this context by a detailed explanation of its optional variants:

The key to the method for preparing process gases for heat treatments of metallic materials/workpieces in industrial furnace treatment chambers is that the respective process gas is able to be prepared at temperatures that are independent of the temperature in the treatment chamber, in a process separate from the heat treatment process in the treatment chamber, and in a temperature range significantly lower than the temperatures in the heating chamber, up to a temperature of about 1250° C.

The process gas is usually a process gas that is consumed after the heat treatment process or thermochemical treatment, and it is prepared in the separate process.

Process gases are enriched and generated separately in a preparation step according to at least one of the following reaction equations, for example, $$2CH_4 + O_2 \Rightarrow 2CO + 4H_2$$

$$CH_4 + CO_2 \Rightarrow 2CO + 2H_2$$

$$CH_4 + H_2O \Rightarrow CO + 3H_2$$

or an equation having equivalent effect.

After a carburising or heat treatment process step according to one of the following reaction equations, for example, $$2CO \rightarrow C + CO_2$$

$$CO + H_2 \rightarrow C + H_2O$$

$$CO \rightarrow C + 0.5O_2$$

or an equation having equivalent effect, the used process gas is returned to the treatment chamber.

The sequence of the preparation step and the process steps of heat treatment, thermochemical treatment or carburisation is carried out in a closed circuit via the preparation step and in a preparation chamber having a catalyst and temperature adjustment device that is separate from the treatment chamber of the industrial furnace.

For this, a module may be used that includes the preparation chamber with the catalyst and temperature adjustment device, wherein an external module is particularly advantageous for industrial furnaces that need to be retrofitted.

On the other hand, a module that is integrated in the industrial furnace may also be used, particularly for new installations. The module may be connected to the treatment chamber via lines.

The used process gas may be extracted from the treatment chamber and returned to the preparation chamber via an outflow line, and the prepared process gas may be compressed and fed into the treatment chamber from the preparation chamber via an inflow line.

At least one process gas compressor is used to accelerate the closed circuit of extracting the used process gas and feeding the prepared process gas back, and to at least homogenise and compress it, and transport it with a higher level of activation. At least one process gas compressor is functionally integrated in the preparation step, and a turbocharger may be used as the process gas compressor. A piston compressor may be used as the process gas compressor.

In this way, the preparation of process gases for heat treatments of metallic materials/workpieces in industrial furnace treatment chambers, which process gas includes at least a first treatment medium as a protective gas, which may include the components carbon dioxide, oxygen and steam in addition to the components carbon monoxide, hydrogen and nitrogen, and a second treatment medium as a reagent gas, which initiates a thermochemical process, may proceed as follows:

a) In the preparation step, the process gas is prepared with respect to at least one of the properties thereof that are essential for heat treatment, such as chemical properties, temperatures, pressures or flow speeds, in a separate module outside of the treatment chamber and the industrial furnace, and in this step b) the components, such as carbon dioxide, oxygen and steam react catalytically with a hydrocarbon as a reagent gas to yield carbon monoxide and hydrogen, and after this reaction the protective gas has an adjusted C potential, wherein c) the C potential is adjusted with respect to at least one of the parameters such as temperature, pressure and flow speed depending on the conditions in the treatment chamber and the prepared process gas, having been compressed, homogenised and accelerated is fed into the treatment chamber via the process gas compressor and directed and controlled with respect to the materials/workpieces via a single-point or multipoint feed system, and d) in the treatment chamber at least one treatment medium of the process gas is recirculated and recovered for preparation in the separate module.

Air from a cold area may be added to the treatment media of the process gas being prepared.

The used process gas or at least one of its treatment media is extracted from the treatment chamber and fed back into the treatment chamber after it has been prepared.

At least one process gas compressor is used for the flow accelerating and compressing circulation of at least one treatment medium of the process gas being prepared, with which air from a cold area may be mixed for cooling. The process gas compressor may be driven by a blower.

The compressing, mixing/homogenising and/or accelerating transport of the process gas is directed towards the materials/workpieces of the batch to be treated via the single-point or multipoint feed system, which may be adapted to the treatment chamber of the respective furnace type. Flow optimising guidance devices are able to assist the directed transport of the process gas towards the workpieces/materials.

It is conceivable for the process gas or at least one of the treatment media to be diverted from at least one other industrial furnace or treatment chamber.

In order to control and adjust as well as monitor the process atmosphere in the treatment chamber of the industrial furnace or the temperature of the process gas, equipment having at least one of the requisite elements such as probes, analysers and sensors is used to measure the temperature and CO content as well as the pressure in the treatment chamber and at least one further parameter, such as the oxygen partial pressure, $CO_2$ content, and dewpoint of the atmosphere in the treatment chamber, and subsequently to regulate the preparation of the process gas in the preparation chamber and to control the inflow or outflow thereof according to the reconditioning time for at least one treatment medium from the treatment chamber.

The reconditioning time may be controlled according to at least one of the parameters such as
a) rotating speed of the compressor and
b) number of times the process gas passes through the preparation chamber with the catalyst without interruption.

Software may be used for controlling and adjusting by segments at least one treatment medium of the process gas to be prepared for the atmosphere in the treatment chamber by at least a pulsed, timed or constant addition of at least one of the treatment media as reagent gases.

At least one treatment medium of the process gas may be used for several industrial furnaces or treatment chambers.

Partial mass flows of the process gas may be produced and controlled in at least one process step.

In order to carry out the method, the device includes a closable preparation chamber equipped with a catalyst and temperature adjustment device for preparing the process gases, the functionally integrated process gas compressor, equipment functionally connected to the treatment chamber of the industrial furnace, the preparation chamber and the process gas compressor for measuring the inflow of the process gas treatment media, and a switching unit for controlling and adjusting at least one of the parameters of the process gas being prepared in the preparation chamber for the purpose of feeding treatment media, feeding the prepared process gas into the industrial furnace treatment chamber, and the C level, and for extracting at least one of the treatment media.

The device may be configured as a separate module including a) a housing with the closable preparation chamber, the catalyst and the temperature adjustment device, which housing is equipped with at least one detachable and sealable inflow line each for the prepared process gas or components thereof as treatment media to be introduced into the industrial furnace treatment chamber, and one outflow line for at least one treatment medium from an area of from the treatment chamber of the industrial furnace, b) equipment for measuring the inflow of the process gas treatment media, the pressure in the treatment chamber, the rotating speed of the process gas compressor, the actuation of elements such as valves in order to create a partial mass flow of the process gas, and the temperature of the catalyst, and c) the switching unit for controlling and adjusting the parameters such as pressure, temperature, volume flow of the process gas to be prepared in the preparation chamber, wherein the process gas compressor may be attached to the treatment chamber.

It is preferably also possible to attach the process gas compressor to the preparation chamber.

It is conceivable for the module to be configured as a separate module integrated in the industrial furnace, and in this case the module may also be designed functionally as a retort.

Preferably for retrofits according to the invention, it is designed as separate module that may be connected externally to an existing industrial furnace.

The respective module may be lined with a ceramic material.

The equipment is equipped in detail with at least one of the following elements:

d) probes, analysers and sensors for measuring a temperature, a CO content and a pressure in the treatment chamber, and at least one more of the parameters such as oxygen partial pressure, $CO_2$ content, and dewpoint of the atmosphere in the treatment chamber, e) a switching unit (2.5) as a control and adjustment device for preparing the process gas (3) in preparation chamber (2.2), and controlling the inflow or outflow according to the reconditioning time, and f) means for controlling a residence time, cycles or a partial mass flow of the process gas (3) in preparation chamber (2.2) or treatment chamber (1.1).

DETAILED DESCRIPTION OF THE INVENTION

Figure 3:
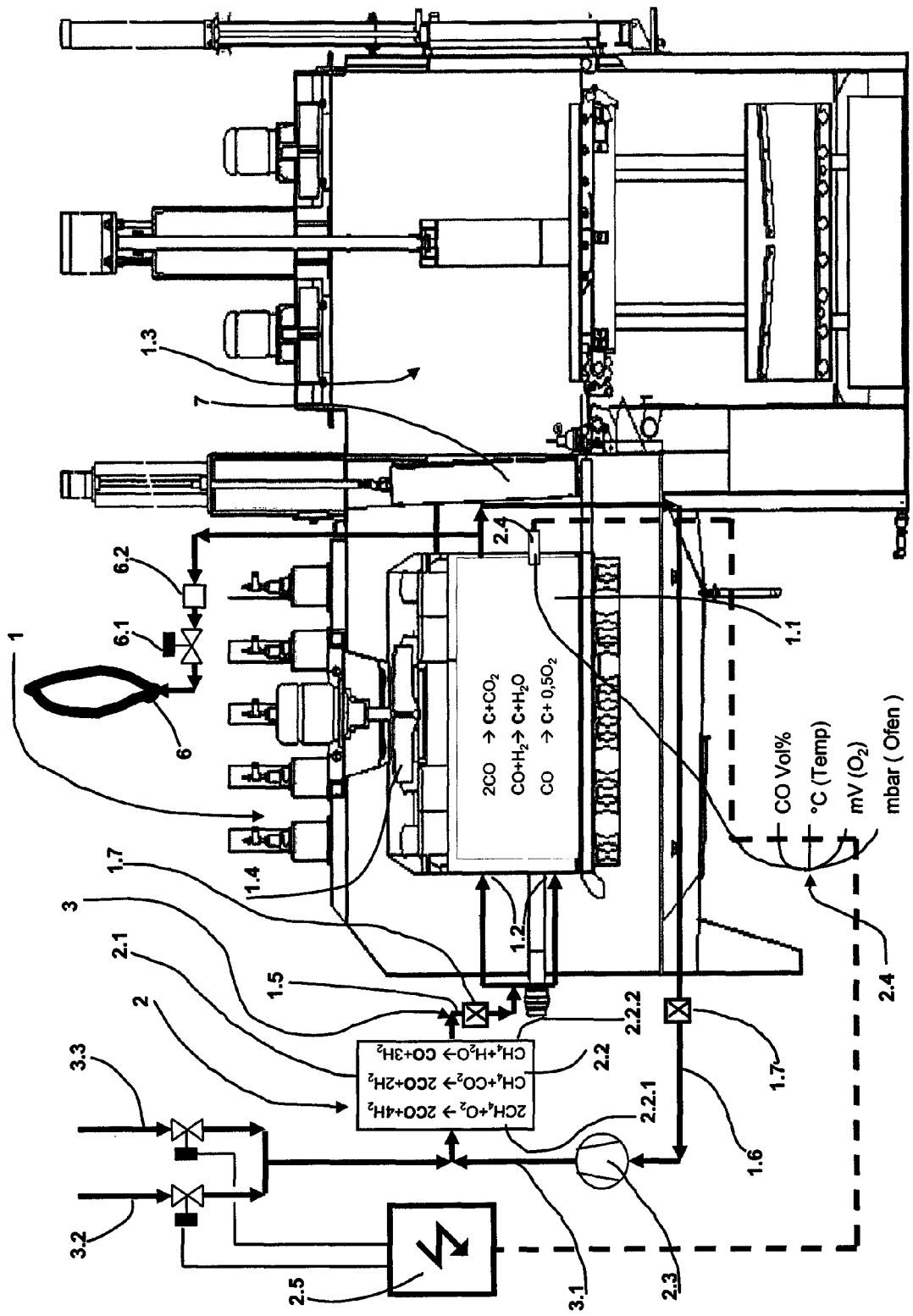
FIG. 3 is a diagrammatic representation of an example of an industrial furnace operated according to the method and using the device according to the invention for preparing process gases.

FIG. 3 is a diagrammatic representation of a plant designed according to the invention including for example an industrial furnace 1 that is suitable for retrofitting. Industrial furnace 1 has a treatment chamber 1.1, a multipoint feeder as a multipoint feed system 1.2, and a quenching area 1.3.

Even though a single-point feed is essentially possible, the advantages offered by a multi-point feed 1.2 for siphoning the reaction gas to be prepared from the treatment chamber 1.1 and returning the gas prepared in the preparation chamber 2.2 to the treatment chamber 1.1 are here to be realized by using an interface in the form of a coaxial dual-pipe with an inner pipe that is somewhat longer than the outer pipe, and by siphoning the reaction gas to be prepared via the inner pipe, and returning the prepared gas via the outer pipe.

A treatment chamber circulation system 1.4 is arranged above treatment chamber 1.1.

An inflow line 1.5 for a process gas 3 enters treatment chamber 1.1, and an outflow line 1.6 for extracting at least a first treatment medium 3.1 of process gas 3 exits treatment chamber 1.1.

An external module 2 consists of a housing 2.1 with a preparation chamber 2.2, which is equipped with a catalyst 2.2.1 and a temperature adjustment device 2.2.2. Preparation chamber 2.2 is connected to treatment chamber 1.1 via inflow line 1.5 for the process gas 3. A process gas compressor 2.3, which may be in the form of a turbocharger for example, is arranged before preparation chamber 2.2 in outflow line 1.6—primarily in order to extract a first treatment medium 3.1 of process gas 3 from treatment chamber 1.1 more quickly. Process gas compressor 2.3 also ensures that process gas 3 is highly compressed during preparation in preparation chamber 2.2, and that the prepared process gas 3 is forwarded to treatment chamber 1.1 in a highly compressed state.

In addition, the preparation chamber 2.2 can be designed to be fire-resistant and gastight, and provided with a second heater and temperature controller.

In order to accelerate the gas reactions, metals, in particular nickel, are used as the material for the catalyst 2.2.1, wherein the use of the catalyst 2.2.1 has been proven effective for scrubbing the exhaust gas in passenger car engines.

In order to prevent a reactive breakdown of the introduced process gas 3 after it exits the treatment chamber 1.1 or exits the preparation chamber 2.2, the method can be expanded so as to cool this process gas 3.

To this end, a cooling aggregate 1.7, preferably one designed as a ribbed pipe piece with ducted or induced cooling, is allocated to at least inflow line 1.5 or outflow line 1.6.

As an alternative, a reactive breakdown of the introduced process gas 3 can be avoided by heat-insulating or heating the latter after it exits the treatment chamber 1.1 or exits the preparation chamber 2.2, so that it achieves its gas temperature.

In the above alternative case, insulation or a first heater would have to be allocated to at least inflow line 1.5 or outflow line 1.6.

Equipment 2.4 for measuring the supply of treatment media 3.1, 3.2 of process gas 3, the pressure in treatment chamber 1.1, the rotating speed of the process gas compressor 2.3, and the temperature of catalyst 2.2.1 is connected to treatment chamber 1.1 and to a switching unit 2.5 for controlling and adjusting the parameters such as pressure, temperature, the volume flow of the process gas 3 to be prepared in preparation chamber 2.2. for the purpose of introducing treatment media 3.1, 3.2 and air 3.3, introducing the prepared process gas 3 into treatment chamber 1.1 of industrial furnace 1 and the C level, and extracting at least one of treatment media 3.1, 3.2.

The expanded equipment 2.4 for an input/output monitoring system designed as a control loop encompasses (not to be shown)

Gas composition analysers, in particular for gas components CO and $CH_4$, but also $CO_2$ and $H_2$, and potentially $H_2O$ and/or $O_2$, Sensors for determining the quantity and temperature of the gas flowing into the preparation chamber 2.2 for preparation and flowing out of the preparation chamber 2.2 after prepared, Controllable metering valves and rate meters for the unburned gases fed into the preparation chamber 2.2, and A programmable control system for processing the measuring data, calculating the target variables, and relaying the control signals to the actuators, such as valves.

Figure 1:
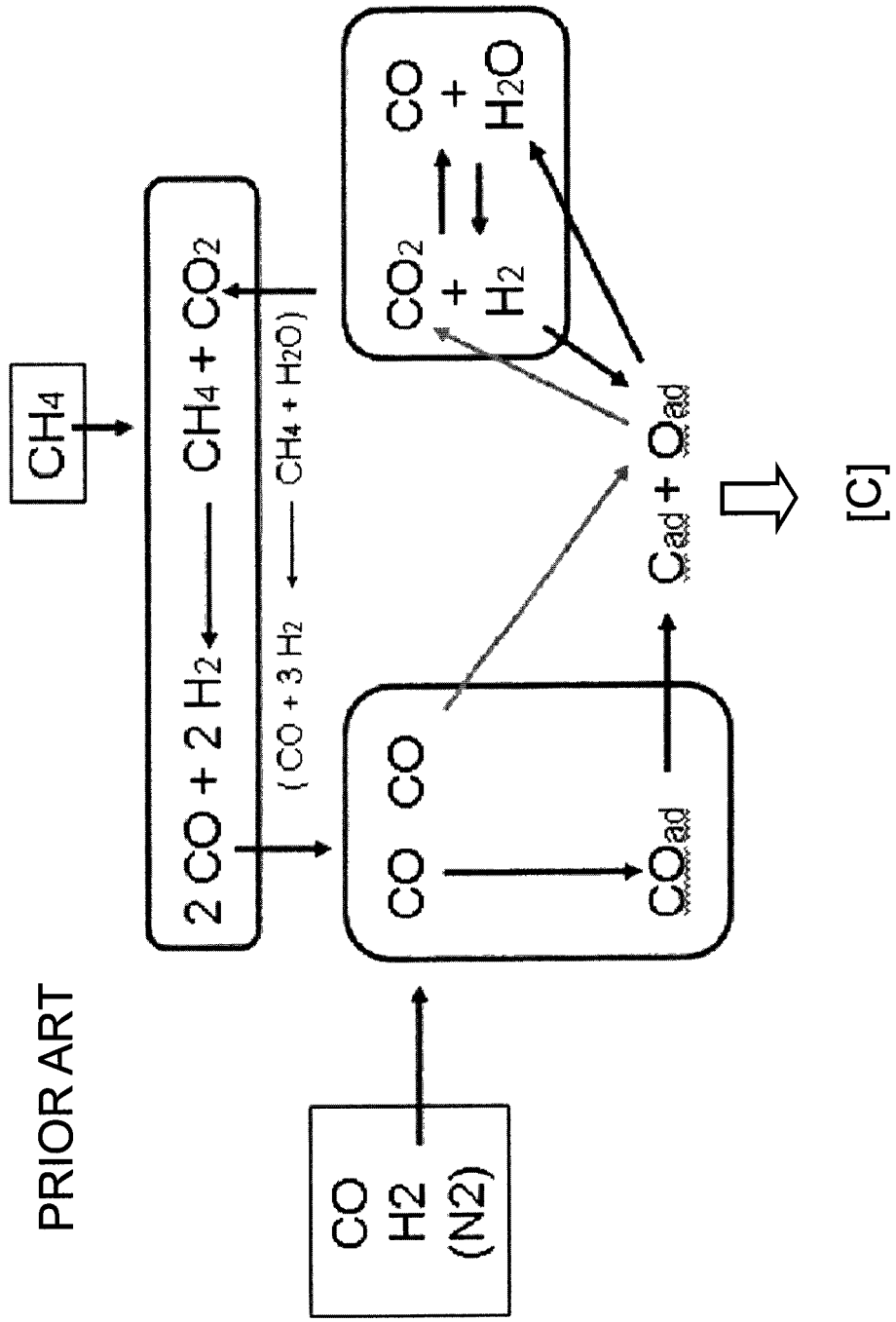
FIG. 1 is a diagrammatic representation of a carburisation reaction on the surface of a part and secondary reactions in the furnace atmosphere according to the described prior art.
Figure 2:
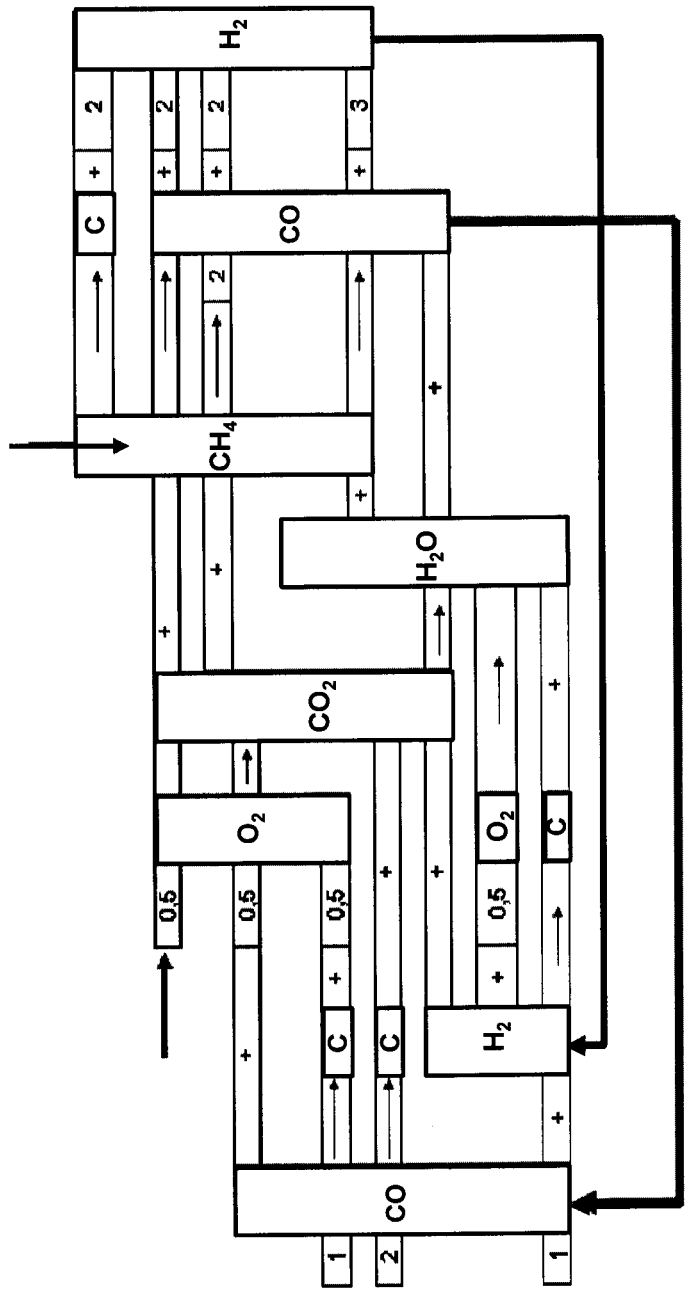
FIG. 2 is a diagrammatic representation of the reactions known previously in principle in a treatment and preparation chamber designed in accordance with DE 10 2008 029 001.7-45 including recirculation of the prepared gas.

With this system, the method according to the invention for preparing the respective process gas 3 at temperatures up to about 1250° C. that are uncoupled from the temperature in treatment chamber 1.1, is enriched and generated in a preparation step, in this example according to a reaction equation $$2CH_4 + O_2 \Rightarrow 2CO + 4H_2$$

$$CH_4 + CO_2 \Rightarrow 2CO + 2H_2$$

$$CH_4 + H_2O \Rightarrow CO + 3H_2$$

and the used process gas 3 is returned to treatment chamber 1.1 after a carburisation process step (see FIGS. 1 and 2), in this example according to a reaction equation $$2CO \rightarrow C + CO_2$$

$$CO + H_2 \rightarrow C + H_2O$$

$$CO \rightarrow C + 0.5 O_2$$

In this context, it should be noted again it is within the scope of the central idea of the invention that other reactions may also take place according to the composition of the gas components and depending on the corresponding heat treatment methods for preparing the process gas 3 and its consumption as part of the treatment.

The sequence of the preparation step and the process step—as here of the carburisation—takes place in a recirculating circuit. The preparation step is carried out in preparation chamber 2.2 which is equipped with catalyst 2.2.1 and temperature adjustment device 2.2.2 and separate from industrial furnace 1 but connected to treatment chamber 1.1 via lines 1.5, 1.6.

The entire recirculation process also encompasses the generation of the reaction gas to be prepared as a process gas 3 in preparation chamber 2.2.

The following steps are required for this purpose:
a) Using the preparation chamber 2.2 as a type of endothermic gas generating system, in such a way as to entirely or partially prevent the supply of gas from the treatment chamber 1.1 into the preparation chamber 2.2,
b) Raising the quantities of hydrocarbons and oxidizing gases metered in the preparation chamber 2.2 based on the required amount of endothermic gas to be generated, and analysing and regulating the quality of the generated endothermic reaction gas, and c) Relaying this generated process gas 3 as a quasi-endothermic gas to the treatment chamber 1.1 in a hot or cooled state.

After the treatment chamber 1.1 has been scoured with the endothermic reaction gas generated in this way in the preparation chamber 2.2, preparations for a thermochemical heat treatment are complete, and the preparation chamber 2.2 for the gas generating process is switched over to the actual preparation process.

The used process gas 3 is accelerated out of treatment chamber 1.1 through outflow line 1.6 exiting treatment chamber 1.1 and to preparation chamber 2.2 by accelerating process gas compressor 2.3, and after it has been prepared it is returned as prepared and highly compressed process gas 3 out of preparation chamber 2.2 through infeed line 1.5 to treatment chamber 1.1. This sequence is supported by process gas compressor 2.3 significantly with respect to the improved effects according to the invention of gas reactions for generating carburising gas components in the atmosphere, convective gas phase homogenisation for the transport of carbon-containing molecules in the gas phase and to the part, transport by diffusion of carbon-containing molecules through the flow boundary layer to the surface of the part, dissociation and adsorption in terms of splitting of molecules on the surface of the part, absorption of the carbon by the surface of the part, and diffusion of the carbon into the part.

The unburned gases being fed into the preparation chamber 2.2, such as natural gas and air, along with other hydrocarbons and other oxidizing gases, can be adjusted relative to a supplied overall quantity and the ratio of supplied individual quantities, based on the quantity and composition of the gas to be prepared and the desired preparation result.

The composition, flowing quantity and temperature are here measured for the process gas 3 to be prepared after exits the treatment chamber 1.1 and before it enters the preparation chamber 2.2, as well as for the prepared gas after it exits the preparation chamber 2.2 and before it enters the treatment chamber 1.1.

The entire quantity of the unburned gases fed into the preparation chamber 2.2 along with the relative quantities of individual unburned gas components are continuously varied relative to each other in such a way as to yield a process-optimised preparation result.

This sequence forms a closed control loop, in which target variables for the prepared gas are defined based on an analysis of the gas to be prepared, in particular with respect to CO content and $CH_4$ content, and potentially also with respect to H2 content and $CO_2$ or $H_2O$ content. Attainment of target variables is ensured by varying the quantities of individual unburned gas components fed to the preparation chamber 2.2, and monitored and readjusted as needed by analysing the prepared process gas 3.

For the preparation of process gases 3, this includes at least first treatment medium 3.1 as the protective gas, which includes components carbon dioxide, oxygen and steam in addition to minimum components carbon monoxide, hydrogen, and nitrogen, and second treatment medium 3.2 as the reagent gas, which initiates the carburising process.

The processes may be summarised as follows:

process gas 3 is accordingly prepared in the preparation step with regard to at least one of the properties thereof that are essential for the heat treatment, such as chemical properties, temperatures, pressures, or flow speeds, separately in external module 2, outside of treatment chamber 1.1 and industrial furnace 1, in this context, the components such as carbon dioxide, oxygen, and steam react catalytically with a hydrocarbon as a reagent gas to yield carbon monoxide and hydrogen, and following this reaction the protective gas will have an adjusted C potential, the C potential is adjusted according to at least one of the parameters, such as temperature, pressure, and flow speed depending on the conditions in treatment chamber 1.1 and having been compressed, homogenised and accelerated the prepared process gas 3 is fed in controlled manner back to treatment chamber 1.1 with the aid of process gas compressor 2.3 and directed towards the materials/workpieces via, in this case, multipoint feed system 1.2, and at least one treatment medium 3.1, 3.2 of process gas 3 is recirculated in treatment chamber 1.1 and recovered for preparation in external module 2.

If necessary, air 3.3 from a cold area may be added to treatment media 3.1, 3.2 of the process gas 3 to be prepared.

The used process gas 3 or at least one of the treatment media 3.1, 3.2 thereof is extracted from treatment chamber 1.1 by suction and then returned to treatment chamber 1.1 after it is has been prepared.

If necessary, several process gas compressors 2.3 may be used for flow-accelerating and compressing circulation of at least one treatment medium 3.1, 3.2 of the process gas 3 to be prepared, and air 3.3 is also supplied to these from the cold area for cooling purposes.

Process gas compressor 2.3 may be driven by a blower, but this is not shown in the figure.

In general, it is advantageous if the compressing, mixing/homogenising and/or accelerating transport of the process gas 3 is directed at the materials/workpieces of the batch that are to be treated via multipoint feed/multiple point feeder system 1.2, which may also be adapted to the treatment chamber 1.1 of the respective furnace type.

The prepared process gas 3 may be directed at the workpieces/materials economically via flow optimising guidance devices, but these are not illustrated in the figure.

The method is used advantageously in furnace lines, for example, which are not shown here, if the process gas 3 or at least one of the treatment media 3.1, 3.2 is diverted from at least a second industrial furnace 1.

In order to control and adjust as well as monitor the process atmosphere in treatment chamber 1.1 of industrial furnace 1 or the temperature of the process gas 3, equipment 2.4 having at least one of the requisite elements such as probes, analysers and sensors is used to measure the temperature and CO content as well as the pressure in treatment chamber 1.1 and at least one more of the parameters, such as the oxygen partial pressure, $CO_2$ content, and dewpoint of the atmosphere in treatment chamber 1.1, and subsequently to regulate the preparation of the process gas 3 in preparation chamber 2.2 and to control the inflow into treatment chamber 1.1 or outflow of at least one treatment medium 3.1, 3.2 from treatment chamber 1.1.

Software is used purposefully for control and adjustment of at least one treatment medium 3.1, 3.2 of the process gas 3 to be prepared for the atmosphere in treatment chamber 1.1, and it controls or adjusts the pulsed, timed, and/or constant feeding of at least one of the treatment medium 3.1, 3.2, for example the reagent gases, by segments.

The method is capable of being expanded, for example in furnace lines, such that at least one treatment medium 1, 3.2 of the process gas 3 is use for multiple industrial furnaces 1 or treatment chambers 1.1.

It is particularly advantageous if the process of controlling and adjusting as well as monitoring the process atmosphere in treatment chamber 1.1 of industrial furnace 1 or the temperature of the process gas 3, is assured by equipment 2.4 having at least one of the requisite elements such as probes, analysers and sensors, which measure the temperature and CO content as well as the pressure in treatment chamber 1.1 and at least one more of the parameters, such as the oxygen partial pressure, $CO_2$ content, and dewpoint of the atmosphere in treatment chamber 1.1, and subsequently regulates the preparation of the process gas 3 in preparation chamber 2.2 and controls the inflow or outflow thereof according to the reconditioning time for at least one treatment medium 3.1, 3.2 from treatment chamber 1.1.

In this context, the reconditioning time is controlled according to at least one of the parameters such as
 a) rotating speed of the compressor and
 b) number of times the process gas 3 passes through preparation chamber 2.1 with catalyst 2.2 without interruption.

Accordingly, the device for carrying out the method as has already been described above with an external module 2 includes
 a) the closable preparation chamber 2.2 with catalyst 2.2.1 and temperature adjustment device 2.2.2 for preparing the process gases 3, which is via one detachable and sealable inflow line 1.5 for the prepared process gas 3 or components thereof such as treatment media 3.1, 3.2 to be introduced into treatment chamber 1.1 of industrial furnace 1, and outflow line 1.6 for at least one treatment medium 3.1, 3.2 from an area or from the treatment chamber 1.1 of industrial furnace 1,
 b) the blower-type compressor 2.3 with drive unit attached to and functionally integrated with preparation chamber 2.2, and
 c) equipment 2.4 for measuring the inflow of treatment media 3.1, 3.2 of the process gas 3, the pressure in treatment chamber 1.1, the rotating speed of process gas compressor 2.3, and the temperature of catalyst 2.2.1, which equipment is connected functionally to treatment chamber 1.1 of the industrial furnace, preparation chamber 2.2, and process gas compressor 2.3,
 d) switching unit 2.5 for controlling and adjusting parameters such as pressure, temperature, volume flow of the process gas to be prepared in preparation chamber 2.2 for the purpose of feeding treatment media 3.1, 3.2, feeding the prepared process gas 3 into treatment chamber 1.1 of industrial furnace 1, and the C level, as well as extracting at least one of the treatment media 3.1, 3.2.

In this example, external module 2 is constructed as a housing with closable preparation chamber 2.2, catalyst 2.2.1, and temperature adjustment device 2.2.2. Housing 2 has at least one detachable and sealable infeed line 1.5 each for the prepared process gas 3 or the components thereof, such as treatment media 3.1, 3.2, to be introduced into treatment chamber 1.1 of industrial furnace 1, and one outflow line 1.6 for at least one treatment medium 3.1, 3.2 from treatment chamber 1.1 of the industrial furnace or an area thereof.

Equipment 2.4 is to be designed for measuring the inflow of treatment media 3.1, 3.2 of the process gas 3, the pressure in treatment chamber 1.1, the rotating speed of process gas compressor 1.4, 2.3 and for actuating elements such as valve to create a partial mass flow of the process gas 3, and the temperature of catalyst 2.2.1.

Switching unit 2.5 must be provided for controlling and adjusting parameters such as pressure, temperature, volume flow of the process gas 3 to be prepared in preparation chamber 2.2.

A turbocharger may be used as the process gas compressor 1.4 attached to treatment chamber 1.1.

For special new constructions, separate module 2 may be designed as a module integrated in industrial furnace 1, though this is not shown here, and such a configuration as a retort is conceivable.

In the example presented here, a preferred illustration of separate module 2 is represented as a module that may be connected to industrial furnace 1 externally.

For module 2 a lining with a ceramic material may be used, such as is known from the prior art described in the introduction.

Finally, the device includes the equipment 2.4 indicated previously, having at least one of the following elements:
 a) probes, analysers and sensors for measuring a temperature, a CO content and a pressure in treatment chamber 1.1, and at least one more of the parameters such as oxygen partial pressure, $CO_2$ content, and dewpoint of the atmosphere in treatment chamber 1.1,
 b) switching unit (2.5) as a control and adjustment device for preparing the process gas 3 in preparation chamber 2.2, and controlling inflow or outflow according to the reconditioning time, and
 c) means for controlling a residence time, cycles or a partial mass flow of the process gas 3 in preparation chamber 2.2 or treatment chamber 1.1.

LEGEND

1=Industrial furnace
1.1=Treatment chamber
1.2=Multipoint feed
1.3=Quenching area
1.4=Treatment chamber circulating system
1.5=Inflow
1.6=Outflow
1.7=Cooling aggregate
2=Module
2.1=Housing
2.2=Preparation chamber
2.2.1=Catalyst
2.2.2=Temperature control device
2.3=Process gas compressor
2.4=Equipment
2.5=Switching unit for control and adjustment
3=Process gas
3.1=First treatment medium
3.2=Second treatment medium
3.3=Air

The invention claimed is:
1. A device for preparing a process gas for use in a treatment chamber of an industrial heat treating furnace, said device comprising:
 a) a closable preparation chamber (2.2) for preparing a process gas (3) comprising a catalyst (2.2.1) and a temperature adjustment device (2.2.2), said preparation chamber being configured as a module that is separated from a treatment chamber (1.1) of an industrial heat treating furnace (1);

b) a gas inflow line (1.5) connected between said preparation chamber and the treatment chamber for conducting the process gas from said preparation chamber to the treatment chamber;

c) a gas outflow line (1.6) connected between the treatment chamber and said preparation chamber for conducting a treatment medium of the process gas from the treatment chamber to said preparation chamber;

d) a process gas compressor (2.3) functionally integrated with said preparation chamber and connected in said gas outflow line;

e) equipment (2.4) for measuring one or more parameters related to an inflow of treatment media (3.1, 3.2) of the process gas (3), the equipment being connected functionally to the treatment chamber (1.1) of the industrial heat treating furnace, to said preparation chamber (2.2), and to said process gas compressor (2.3); and f) a switching unit (2.5) connected to said equipment (2.4) for receiving the one or more parameters and controlling and adjusting a property of the process gas to be prepared in said preparation chamber (2.2) for the purpose of feeding the treatment media (3.1, 3.2) into said preparation chamber, feeding the prepared process gas (3) into the treatment chamber (1.1) of the industrial furnace (1), adjusting a C level in the treatment chamber, and extracting at least one of the treatment media (3.1, 3.2).

2. The device as claimed in claim 1 wherein said equipment (2.4) includes sensors for measuring gas pressure in the treatment chamber (1.1), rotating speed of the process gas compressor (2.3), actuation of elements such as valves in order to create a partial mass flow of the process gas (3), the temperature of the catalyst (2.2.1), and the switching unit (2.5) is configured for controlling and adjusting one or more parameters selected from the group consisting of pressure, temperature, volume, and flow of the process gas in the preparation chamber (2.2).

3. The device as recited in claim 1 wherein said equipment (2.4) comprises an input/output monitoring system including a control loop, which comprises:

a gas composition analyzer adapted for detecting a gas component selected from the group consisting of CO, $CH_4$, $CO_2$, $H_2$, $O_2$, and a combination thereof;

sensors for determining the quantity and temperature of gas flowing into the preparation chamber (2.2) and flowing out of the preparation chamber (2.2), controllable metering valves and rate meters for the unburned gases fed into the preparation chamber (2.2), and a programmable control system connected to said gas composition analyzer, said sensors, and said controllable metering valves for processing measured data, calculating one or more target variables, generating control signals, and relaying the control signals to one or more actuators.

4. The device as claimed in claim 1 comprising a cooling aggregate (1.7), wherein said cooling aggregate comprises a ribbed pipe piece with ducted or induced cooling and said cooling aggregate is located in one or both of said gas inflow line (1.5) and said gas outflow line (1.6).

5. The device as claimed in claim 1 comprising thermal insulation or a first heater applied to one or both of said inflow line (1.5) or outflow line (1.6).

6. The device as claimed in claim 1 wherein said process gas compressor (2.3) is attached to the treatment chamber (1.1) instead of a treatment chamber circulator (1.4).

7. The device as claimed in claim 1 wherein the process gas compressor (2.3) is attached to the preparation chamber (2.2).

8. The device as claimed in claim 1 wherein the preparation chamber (2.2) is adapted to be heat-resistant and gastight and the temperature adjustment device comprises a heater and a temperature controller connected to said heater.

9. The device as claimed in claim 1 wherein the catalyst (2.2.1) comprises a metal.

10. The device as claimed in claim 1 wherein the catalyst is a metal that is effective for scrubbing exhaust gas in a passenger vehicle engine.

11. The device as claimed in claim 1 wherein said preparation chamber is positioned in the industrial heat treating furnace (1), but separate from the treatment chamber (1.1).

12. The device as claimed in claim 11 wherein said preparation chamber comprises a retort in the treatment chamber.

13. The device as claimed in claim 1 wherein said preparation chamber, said gas inflow line, and said gas outflow line are located externally to the industrial heat treating furnace (1).

14. The device as claimed in claim 1 wherein said gas preparation chamber comprises a lining made from a ceramic material.

15. The device as claimed in claim 1 wherein said equipment comprises one or more of the following features:

a) probes, analysers, and sensors disposed in the treatment chamber (1.1) for measuring the following properties in the treatment chamber (1.1): temperature, CO content, gas pressure, oxygen partial pressure, $CO_2$ content, and dewpoint of the atmosphere in the treatment chamber (1.1);

b) switching unit (2.5) is adapted for controlling gas inflow to or gas outflow from said preparation chamber in accordance with a preselected gas reconditioning time cycle, and c) means for controlling a residence time, a processing cycle, or a mass flow of the process gas (3) in preparation chamber (2.2) or treatment chamber (1.1).

* * * * *